(12) United States Patent
Tanaka et al.

(10) Patent No.: US 11,031,890 B2
(45) Date of Patent: Jun. 8, 2021

(54) MOTOR DRIVE CONTROL DEVICE

(71) Applicant: MINEBEA MITSUMI Inc., Nagano (JP)

(72) Inventors: Masahiro Tanaka, Fukuroi (JP); Yuya Hisatomi, Hamamatsu (JP); Toshihiro Tamitsuji, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/800,269

(22) Filed: Feb. 25, 2020

(65) Prior Publication Data
US 2020/0280275 A1 Sep. 3, 2020

(30) Foreign Application Priority Data

Mar. 1, 2019 (JP) .............................. JP2019-037862

(51) Int. Cl.
*H02P 13/10* (2006.01)
*H02P 29/032* (2016.01)
(52) U.S. Cl.
CPC ............ *H02P 13/10* (2013.01); *H02P 29/032* (2016.02)
(58) Field of Classification Search
CPC ....................................................... H02K 1/27
See application file for complete search history.

(56) References Cited

U.S. PATENT DOCUMENTS

| 5,510,658 | A | * | 4/1996 | Nakayama | ................ | H02H 1/06 307/10.1 |
| 2002/0096959 | A1 | * | 7/2002 | Qin | ......................... | H02K 3/28 310/208 |
| 2011/0001490 | A1 | * | 1/2011 | Eberheim | ............. | G01N 27/023 324/654 |
| 2011/0227419 | A1 | * | 9/2011 | Sato | ..................... | H03H 7/0115 307/104 |
| 2012/0185207 | A1 | * | 7/2012 | Fox | ....................... | G01D 5/2216 702/150 |
| 2013/0264987 | A1 | * | 10/2013 | Uchida | ..................... | H02P 6/08 318/495 |
| 2016/0252029 | A1 | * | 9/2016 | Biagini | ................ | F02D 41/0255 60/320 |

FOREIGN PATENT DOCUMENTS

JP 2009-077543 A 4/2009

* cited by examiner

*Primary Examiner* — Bentsu Ro
(74) *Attorney, Agent, or Firm* — Pearne & Gordon LLP (57) ABSTRACT

A motor drive control device driving a motor having a first system coil and a second system coil, the motor drive control device comprising: a first drive circuit controlling energization of the first system coil; a second drive circuit controlling energization of the second system coil; a first temperature sensor detecting a temperature of the first drive circuit; a second temperature sensor detecting a temperature of the second drive circuit; and a signal output circuit outputting an output signal concerning whether or not any one of the first system coil and the second system coil is in an open state, based on a detection result by the first temperature sensor and a detection result by the second temperature sensor.

6 Claims, 7 Drawing Sheets

| STATE\COMPONENTS | THERMISTOR TEMPERATURE RT21, RT41 | TEMPERATURE COMPARISON CIRCUIT | | DECISION SIGNAL OUTPUT CIRCUIT | | OUTPUT SIGNAL |
|---|---|---|---|---|---|---|
| | | P7 | P2 | Q72 | Q73 | |
| NORMAL | $|RT21-RT41| < 10°C$ | OFF | OFF | OFF | OFF | So |
| FIRST SYSTEM COIL DISCONNECTION | $RT41 \geq RT21+10°C$ | OFF | ON | OFF | ON | FG SIGNAL |
| | | ON | OFF | ON | OFF | Low |
| SECOND SYSTEM COIL DISCONNECTION | $RT21 \geq RT41+10°C$ | | | | | Low |

MOTOR DRIVE CONTROL DEVICE

CROSS REFERENCE TO RELATED APPLICATIONS

This application claims the benefit of Japanese Patent Application No. 2019-37862, filed Mar. 1, 2019, which is hereby incorporated by reference in its entirety.

BACKGROUND

Technical Field

The present disclosure relates to a motor drive control device, and particularly relates to a motor drive control device having two systems of drive circuits.

Background Art

In the past, a motor drive device driving a single-phase motor has been disclosed (for example, Japanese Patent Application Laid-Open No. 2009-77543).

SUMMARY

Here, failures may occur in a drive circuit of the motor drive control device so that it becomes impossible to drive the motor. When it becomes impossible to drive the motor as mentioned above in use of driving the motor in a prescribed rotational direction (forward direction), for example, and an external force works to forcibly rotate the motor in a direction opposite to the prescribed rotational direction (rotate inversely), troubles may occur.

For example, in a case of driving a fan motor by the motor drive control device, if a drive coil of the motor disconnects to cause a drive circuit of the motor drive control device to not normally function, the driving of the fan motor stops. In such case, when air flows into the stopped fan motor due to an operation of another fan motor used along with the stopped fan motor, for example, the stopped fan motor may be rotated inversely. For example, in a case where a plurality of fan motors are used for cooling a device surrounded by a housing and one of the fan motors is rotated inversely in a manner described above, decrease in an internal pressure of the device may be caused to deteriorate a cooling function, possibly affecting functions of the device. Therefore, it is necessary to continue a forward rotation of the fan motor as much as possible.

As a solution to solve the above problem, by including two systems of drive circuits as the motor drive control device, even in a case where one of the drive circuits is failed, the other drive circuit can be used to allow to the driving of the fan motor to continue.

Here, in a case where such a motor drive control circuit is provided with two systems of drive circuits, it may be convenient if the motor drive control circuit and devices using it and the like can be controlled depending on how drive state each drive circuit is in (for example, whether each drive circuit is in a normally driving state) and if a user can be notified of the drive state of the motor (whether normal or abnormal).

The present disclosure is related to providing a motor drive control device capable of continuing a forward rotation of a motor as much as possible and capable of externally notifying a drive state.

In accordance with one aspect of the present disclosure, a motor drive control device driving a motor having a first system coil and a second system coil includes a first drive circuit controlling energization of the first system coil, a second drive circuit controlling energization of the second system coil, a first temperature sensor detecting a temperature of the first drive circuit, a second temperature sensor detecting a temperature of the second drive circuit, and a signal output circuit outputting an output signal concerning whether or not any one of the first system coil and the second system coil is in an open state, based on a detection result by the first temperature sensor and a detection result by the second temperature sensor.

Preferably, the motor drive control device further includes an external output terminal from which the output signal is output, wherein the signal output circuit outputs, when the motor is normally driven, a first output signal as the output signal from the external output terminal, and outputs, when any one of the first system coil and the second system coil is in the open state, a second output signal indicating that the relevant one coil is in the open state, as the output signal, from the external output terminal.

Preferably, the first output signal is a signal of which a voltage periodically varies with a rotation of the motor, and the second output signal is a signal of which a voltage is fixed.

Preferably, the external output terminal is connected to an output terminal of the first drive circuit, and the first output signal is a signal output from the output terminal of the first drive circuit.

Preferably, the signal output circuit includes a comparison unit comparing the detection result by the first temperature sensor with the detection result by the second temperature sensor, and a switching circuit outputting a switching signal, based on a comparison result of the comparison unit, and outputs the output signal in accordance with the switching signal.

Preferably, when a difference between the temperature of the first drive circuit detected by the first temperature sensor and the temperature of the second drive circuit detected by the second temperature sensor is larger than a predetermined value, the signal output circuit outputs an output signal indicating that any one of the first system coil and the second system coil is in the open state.

According to these disclosures, a motor drive control device capable of continuing a forward rotation of a motor as much as possible and capable of externally notifying a drive state can be provided.

DETAILED DESCRIPTION

Hereinafter, a motor drive control device according to embodiments of the present disclosure will be described.

Embodiments

Figure 1:
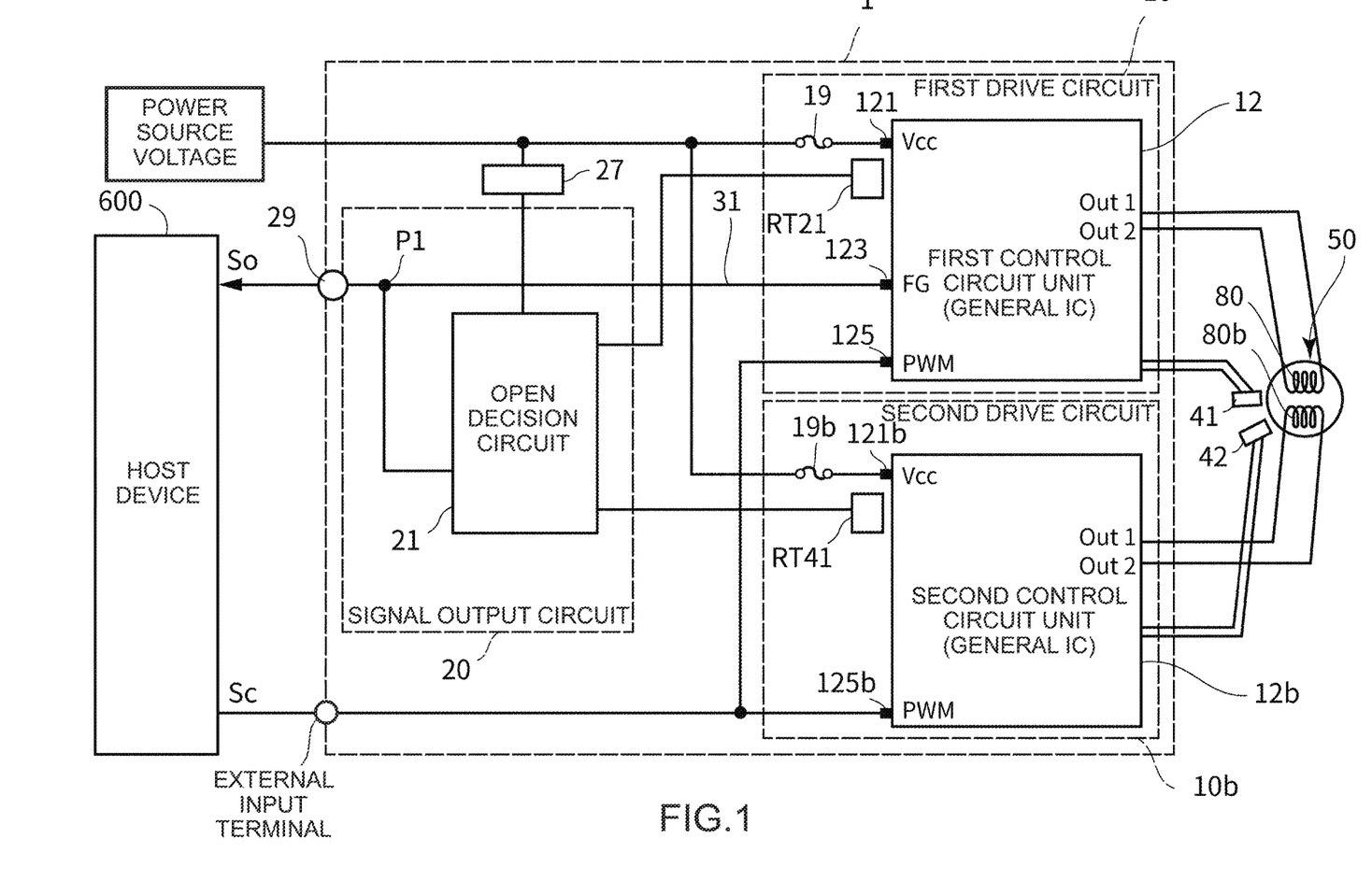
FIG. 1 is a diagram illustrating a configuration of a motor drive control device according to one of embodiments of the present disclosure.

FIG. 1 is a diagram illustrating a configuration of a motor drive control device 1 according to one of embodiments of the present disclosure.

As illustrate in FIG. 1, a motor drive control device 1 is used for a motor device having a motor 50. The motor device includes two position detectors 41 and 42 outputting position signals in accordance with a rotational position of the motor 50. The motor drive control device 1 is externally supplied with a direct-current power source voltage Vdc.

The motor drive control device 1 has an external input terminal to which a signal is input from an outside device and an external output terminal 29 for outputting a signal to an outside device. The motor drive control device 1 is connected to a host device 600.

A speed command signal Sc output from the host device 600 is input to the external input terminal of the motor drive control device 1. The motor drive control device 1 drives the motor 50 in accordance with the input speed command signal Sc.

An output signal So is output from the external output terminal 29 of the motor drive control device 1 to the host device 600. The output signal So is a signal concerning a state of the motor 50. For example, an FG signal having a frequency corresponding to an actual rotational frequency of the motor 50 is output as the output signal So. The host device 600 can know the state of motor 50, based on the output signal So output from the motor drive control device 1. Then, the host device 600 can control an operation of the motor device depending on the state of the motor 50, such as by outputting the speed command signal Sc to the motor drive control device 1.

The motor 50 includes a first system coil 80 and a second system coil 80b wound around teeth (not illustrated). Note that each of the first system coil 80 and the second system coil 80b may be constituted by one coil.

In the present embodiment, the motor drive control device 1 includes a first drive circuit 10 controlling energization of the first system coil 80, a second drive circuit 10b controlling energization of the second system coil 80b, a first temperature sensor RT21 detecting a temperature of the first drive circuit 10, a second temperature sensor RT41 detecting a temperature of the second drive circuit 10b, and a signal output circuit 20.

The first drive circuit 10 includes a first control circuit unit 12 including an inverter circuit (not illustrated) energizing the first system coil 80 and a drive control circuit controlling the inverter circuit, and a fuse 19 provided on a power source supply path from the power source voltage Vdc to the first control circuit unit 12, that is, a power source supply path of the first drive circuit 10. The second drive circuit 10b includes a second control circuit part 12b including an inverter circuit (not illustrated) energizing the second system coil 80b and a drive control circuit controlling the inverter circuit, and a fuse 19b provided on a power source supply path from the power source voltage Vdc to the second control circuit part 12b, that is, a power source supply path of the second drive circuit 10b.

Each of the first control circuit unit 12 and the second control circuit part 12b is one integrated circuit (IC) including the inverter circuit and the drive control circuit. Note that the configuration of the first control circuit unit 12 or the second control circuit part 12b is not limited to that described above, but may not be the integrated circuit, or only a part of the first control circuit unit 12 or the second control circuit part 12b may be an integrated circuit.

In the present embodiment, both the first control circuit unit 12 and the second control circuit part 12b are configured, as hardware, using a general IC having the same configuration. Each of the first control circuit unit 12 and the second control circuit part 12b has a Vcc terminal (a Vcc terminal 121, a Vcc terminal 121b), a PWM terminal (a PWM terminal 125, a PWM terminal 125b), an Out1 terminal, an Out2 terminal, and the like. The Vcc terminals 121 and 121b are connected to the power source voltage Vdc via the fuses 19 and 19b, respectively. The PWM terminals 125 and 125b are connected to the external input terminal, and are terminals to which the speed command signals Sc are input. The Out1 terminals and the Out2 terminals are terminals for energizing the coils 80 and 80b, and connected to the coils 80 and 80b. The first control circuit unit 12 has an output terminal (FG terminal) 123. The second control circuit part 12b is also provided with an output terminal, though illustration thereof is omitted. Note that the first control circuit unit 12 and the second control circuit part 12b may have the configurations as hardware different from each other.

The first position detector 41 is connected to the first drive circuit 10. The second position detector 42 is connected to the second drive circuit 10b. The first position detector 41 is arranged at a position corresponding to the first system coil 80. The second position detector 42 is arranged at a position corresponding to the second system coil 80b.

Two position detectors 41 and 42 output position detection signals in accordance with a position of a rotor of the motor 50. The first position detector 41 outputs the position detection signal to the first control circuit unit 12. The second position detector 42 outputs the position detection signal to the second control circuit part 12b. Note that in the present embodiment, the first and second position detectors 41 and 42 are Hall elements. Each Hall element outputs, as the position detection signal, a Hall signal having a positive or negative polarity. Note that the first and second position detectors 41 and 42 are not limited to the elements the same as each other, and are not limited to the Hall elements.

The output terminal 123 is an FG terminal for outputting the FG signal. Note that the output terminal 123 may be a terminal provided so as to be able to be configured in advance to function as the FG terminal, or as an RD terminal for outputting a lock signal indicating whether or not the motor 50 is in a locked state. A signal line 31 connected to the output terminal 123 is connected to the signal output circuit 20.

The speed command signal Sc and the position detection signal output from the first position detector 41 are input to the first control circuit unit 12. The speed command signal Sc and the position detection signal output from the second position detector 42 are input to the second control circuit part 12b. The speed command signal Sc is a signal concerning the driving of the motor 50, and, to be more specific, is a signal of a voltage corresponding to a rotational frequency (target rotational frequency) at which the motor 50 is rotated. For example, the speed command signal Sc is a PWM (pulse width modulation) signal of duty depending on the target rotational frequency with a high level of 5 volts. Note that the speed command signal Sc may be another kind of signal such as a clock signal having a frequency depending on the target rotational frequency.

The drive control circuit of each of the first control circuit unit 12 and the second control circuit part 12*b* outputs a signal for operating the inverter circuit, based on the position detection signal to control the operation of the inverter circuit. Each of the first control circuit unit 12 and the second control circuit part 12*b* detects the actual rotational frequency (the frequency of actual rotations) of the motor 50, based on the position detection signal to control an ON/OFF operation of a switching element included in the inverter circuit so that the actual rotational frequency of the motor 50 becomes a rotational frequency corresponding to the input speed command. Specifically, the first drive circuit 10 is configured to control energization of the first system coil 80 based on the target rotational frequency externally specified. The second drive circuit 10*b* is configured to control energization of the second system coil 80*b* based on the target rotational frequency externally specified.

The inverter circuit of each of the first control circuit unit 12 and the second control circuit part 12*b* energizes the coils 80 and 80*b* so that directions of currents flowing in the coils 80 and 80*b* included in the motor 50 are switched at a timing in accordance with the position detection signal based on the signal output from the drive control circuit.

As described above, the first control circuit unit 12 outputs from the output terminal 123 the FG signal of which a voltage repeats a high level and a low level at a frequency corresponding to the actual rotational frequency of the motor 50. The FG signal is a signal of which a voltage periodically varies with a rotation of the motor 50. Specifically, the first drive circuit 10 outputs the signal concerning the drive state of the motor 50. The FG signal is input via the signal line 31 to the signal output circuit 20. Note that, instead of the FG signal, the Hall signal or the like of which a voltage periodically varies with the rotation of the motor 50 may be output.

In the present embodiment, the output terminal 123 is configured to output the signal in a so-called open drain manner. Specifically, the output terminal 123 is pulled up to a predetermined voltage to be used so that the voltage becomes a high level at a high impedance (open state). This allows the FG signal having a high level or low level voltage to be output.

The first temperature sensor RT21, which is arranged near the first drive circuit 10, detects a temperature of the first drive circuit 10. Specifically, the first temperature sensor RT21 is arranged near the first control circuit unit 12 where an amount of heat generation is particularly large in the first drive circuit 10 to promptly detect a temperature of the first control circuit unit 12. The first temperature sensor RT21 is a thermistor, for example. That is, the first temperature sensor RT21 outputs a voltage having a magnitude different depending on a temperature as a detection result of the temperature based on a voltage of a drive power source. The first temperature sensor RT21 is connected to the signal output circuit 20.

The second temperature sensor RT41, which is arranged near the second drive circuit 10*b*, detects a temperature of the second drive circuit 10*b*. Specifically, the second temperature sensor RT41 is arranged near the second control circuit part 12*b* where an amount of heat generation is particularly large in the second drive circuit 10*b* to promptly detect a temperature of the second control circuit part 12*b*. The second temperature sensor RT41 is a thermistor, for example. To be more specific, the second temperature sensor RT41 outputs a voltage having a magnitude different depending on a temperature as a detection result of the temperature based on a voltage of a drive power source. The second temperature sensor RT41 is connected to the signal output circuit 20.

The signal output circuit 20 outputs the output signal So concerning the state of the motor 50, based on the detection result by the first temperature sensor RT21 and the detection result by the second temperature sensor RT41. To be more specific, the signal output circuit 20 outputs the output signal So concerning whether or not any one of the first system coil 80 and the second system coil 80*b* is in the open state (disconnecting state), based on the detection result by the first temperature sensor RT21 and the detection result by the second temperature sensor RT41. The signal output circuit 20 outputs the first output signal from the external output terminal 29 when the motor 50 is normally driven, and outputs the second output signal from the external output terminal 29 when any one of the first system coil 80 and the second system coil 80*b* is in the open state, the second output signal indicating that the relevant one coil is in the open state.

In the present embodiment, the signal line 31 is connected to the external output terminal 29 in the signal output circuit 20. Specifically, the external output terminal 29 is connected via the signal line 31 to the output terminal 123 of the first drive circuit 10, and the first output signal is the FG signal output from the output terminal 123 of the first drive circuit 10. In other words, when the motor 50 is normally driven, the signal output circuit 20 outputs, as the first output signal, the FG signal that is output from the output terminal 123, from the external output terminal 29.

On the other hands, when any one of the first system coil 80 and the second system coil 80*b* is in the open state, the signal output circuit 20 outputs the second output signal indicating that the relevant one coil is in the open state and does not output the FG signal. The second output signal is, for example, a signal (Low signal) of which a voltage is fixed to a ground potential. Note that the second output signal is not limited to the Low signal, but, for example, may be a signal of which a voltage is fixed, such as the High signal of which a voltage is fixed to a high level. That is, the second output signal may be a signal different from the first output signal.

The signal output circuit 20 includes an open decision circuit 21. The open decision circuit 21 is connected to the power source voltage Vdc via a regulator 27.

The first temperature sensor RT21 and the second temperature sensor RT41 are connected to the open decision circuit 21. Specifically, an output result by the first temperature sensor RT21 and an output result by the second temperature sensor RT41 are input to the open decision circuit 21. The open decision circuit 21 outputs a switching signal. The switching signal is output to a connection point P1 on the signal line 31 connecting the output terminal 123 to the external output terminal 29.

Figure 2:
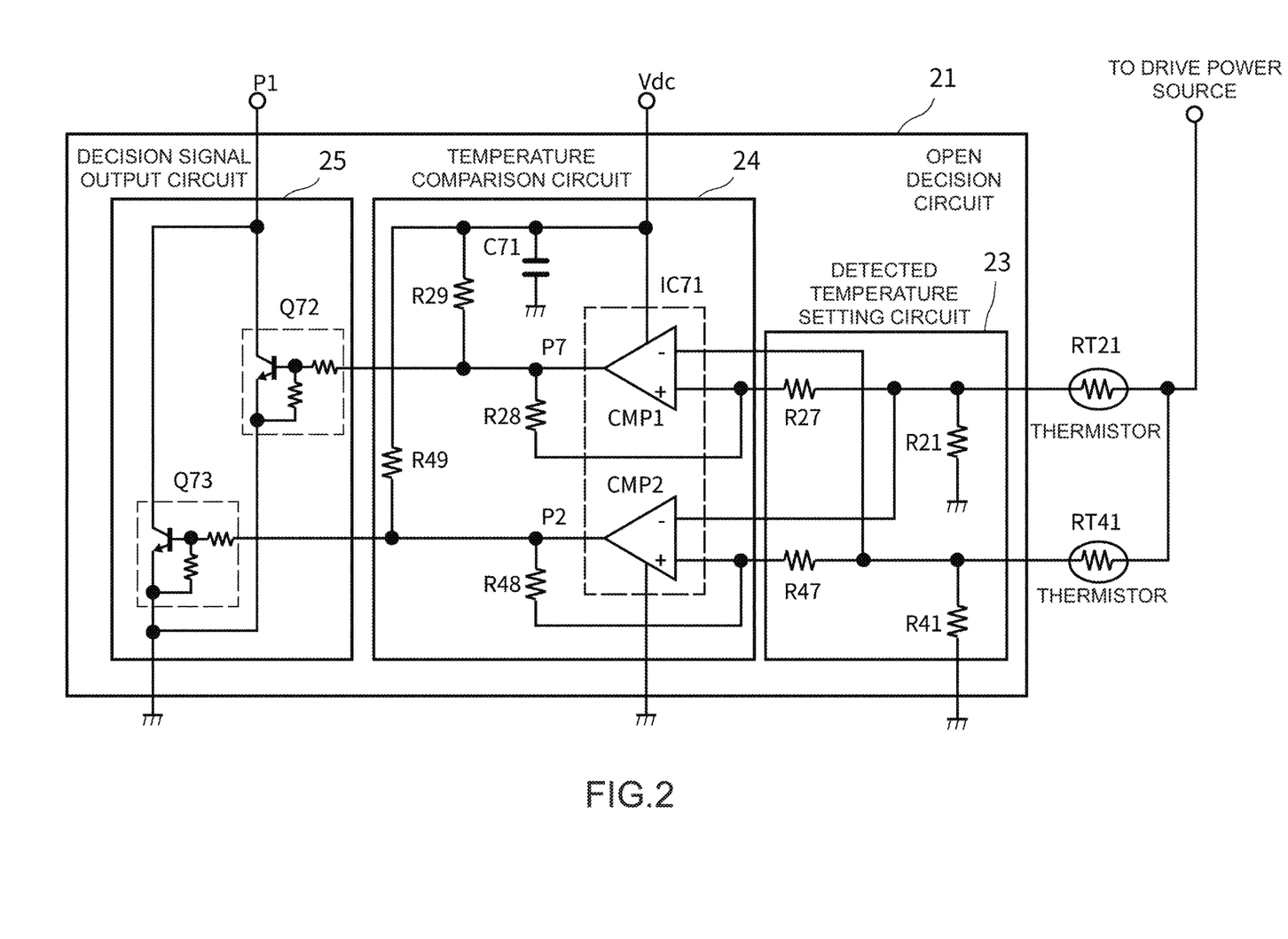
FIG. 2 is a diagram illustrating a configuration of an open decision circuit.

FIG. 2 is a diagram illustrating a configuration of the open decision circuit 21.

As illustrated in FIG. 2, the open decision circuit 21 of the signal output circuit 20 includes a detected temperature setting circuit 23 connected to each of the first temperature sensor RT21 and the second temperature sensor RT41, a temperature comparison circuit 24 (an example of a comparison unit) having two comparators CMP1 and CMP2, and a decision signal output circuit 25 (an example of a switching circuit) that outputs a switching signal based on a comparison result of the temperature comparison circuit 24. The open decision circuit 21 outputs the switching signal from the decision signal output circuit 25 to the connection point P1. The signal output circuit 20 outputs the output signal So in accordance with the switching signal.

The detected temperature setting circuit 23, which is connected to an end of the first temperature sensor RT21 and an end of the second temperature sensor RT41, outputs the voltage as a detection result of the temperature of the first drive circuit 10 by the first temperature sensor RT21 and the voltage as a detection result of the temperature of the second drive circuit 10b by the second temperature sensor RT41 to the temperature comparison circuit 24. The detected temperature setting circuit 23 includes a resistance R21 on a side of the first temperature sensor RT21, a resistance R41 on a side of the second temperature sensor RT41, and resistances R27 and R47 connected to input terminals of the comparators CMP1 and CMP2.

The detected temperature setting circuit 23 divides the voltage input from the regulator 27 for the first temperature sensor RT21 and the resistance R21. Then, the detected temperature setting circuit 23 outputs the divided voltage to an inverting input terminal of the comparator CMP2 and a non-inverting input terminal of the comparator CMP1 through the resistance R27. The detected temperature setting circuit 23 divides the voltage input from the regulator 27 also for the second temperature sensor RT41 and the resistance R41. Then, the detected temperature setting circuit 23 outputs the divided voltage to an inverting input terminal of the comparator CMP1 and a non-inverting input terminal of the comparator CMP2 through the resistance R47.

The temperature comparison circuit 24 includes resistances R28, R29, R48, and R49, and a capacitor C71, besides an IC 71 having two comparators CMP1 and CMP2. In a case where the IC 71 having two comparators CMP1 and CMP2 is not an open collector, the resistances R29 and R49, and the capacitor C71 may not be provided. The resistances R28 and R48 are provided between the non-inverting input terminals and output terminals P7 and P2 for the comparators CMP1 and CMP2, respectively, in order to provide a hysteresis. The power source voltage Vdc is applied via the resistances R29 and R49 to the output terminals P7 and P2 of the comparators CMP1 and CMP2, respectively, and the capacitor C71 for smoothing is provided on their lines.

The decision signal output circuit 25 is connected to the ground potential and the connection point P1 that is on the signal line 31 coupling the output terminal 123 with the external output terminal 29. The comparison result of the temperature comparison circuit 24 is input to the decision signal output circuit 25. Specifically, a voltage of the output terminal P7 of the comparator CMP1 and a voltage of the output terminal P2 of the comparator CMP2 are input to the decision signal output circuit 25. The decision signal output circuit 25 outputs the switching signal to the connection point P1 depending on the voltage of the output terminal P7 of the comparator CMP1 and the voltage of the output terminal P2 of the comparator CMP2. Specifically, the decision signal output circuit 25 switches whether to connect the external output terminal 29 with the ground potential depending on the voltage of the output terminal P7 of the comparator CMP1 and the voltage of the output terminal P2 of the comparator CMP2.

To be more specific, the decision signal output circuit 25 is provided with a transistor Q72 a base of which is connected to the output terminal P7 of the comparator CMP1 via a resistance, and a transistor Q73 a base of which is connected to the output terminal P2 of the comparator CMP2 via a resistance. Resistances are connected between emitters and the bases of the transistors Q72 and Q73, respectively. The emitters of the transistors Q72 and Q73 are connected to the ground potential. Collectors of the transistors Q72 and Q73 are connected to the connection point P1. A switching operation of any one of the transistor Q72 and the transistor Q73 is performed, and thereby, whether to connect the external output terminal 29 with the ground potential is switched.

Such a switching signal switches whether the external output terminal 29 is the ground potential or the high impedance. When the external output terminal 29 is connected to the ground potential, the second output signal, that is the Low signal, output from the signal output circuit 20, and when the external output terminal 29 has the high impedance, the first output signal, that is, the FG signal, is output from the signal output circuit 20. The signal output circuit 20 outputs, as the output signal So, the first output signal to the external output terminal 29, when the motor 50 is normally driven. When any one of the first system coil 80 and the second system coil 80b is in the open state, the signal output circuit 20 outputs, as the output signal So, the second output signal indicating that the relevant one coil is in the open state from the external output terminal 29, as described later. In other words, when any one of the first system coil 80 and the second system coil 80b is in the open state, the open decision circuit 21 operates such that the second output signal is output from the signal output circuit 20, as described later. By doing so, the host device 600 is notified, based on the output signal So, of whether the motor 50 is in a rotating state, or otherwise, whether any one of the first system coil 80 and the second system coil 80b is in the open state.

Here, in the present embodiment, when a difference between the temperature of the first drive circuit 10 detected by the first temperature sensor RT21 and the temperature of the second drive circuit 10b detected by the second temperature sensor RT41 is larger than a predetermined value, the signal output circuit 20 outputs the output signal So indicating that any one of the first system coil 80 and the second system coil 80b is in the open state. To be more specific, in the detected temperature setting circuit 23 and the temperature comparison circuit 24, each element is configured such that the second output signal is output when the difference between the temperature detected by the first temperature sensor RT21 and the temperature detected by the second temperature sensor RT41 becomes 10 degrees C. or more. Specifically, the difference between the temperature detected by the first temperature sensor RT21 and the temperature detected by the second temperature sensor RT41 is 10 degrees C. or more when any one of the first system coil 80 and the second system coil 80b is in the open state, and therefore, in such a case, the second output signal is output as the output signal So, and in other cases, the first output signal is output as the output signal So.

Note that the temperature difference depending on which the second output signal is output from can be adjusted by the first temperature sensor RT21, the second temperature sensor RT41, and resistance values of the resistances R21, R27, R41, and R47 of the detected temperature setting circuit 23.

The operations of the respective components of the signal output circuit 20 and the output signal So output from the signal output circuit 20 may be summarized for each state of the motor 50 as below.

Figure 3:
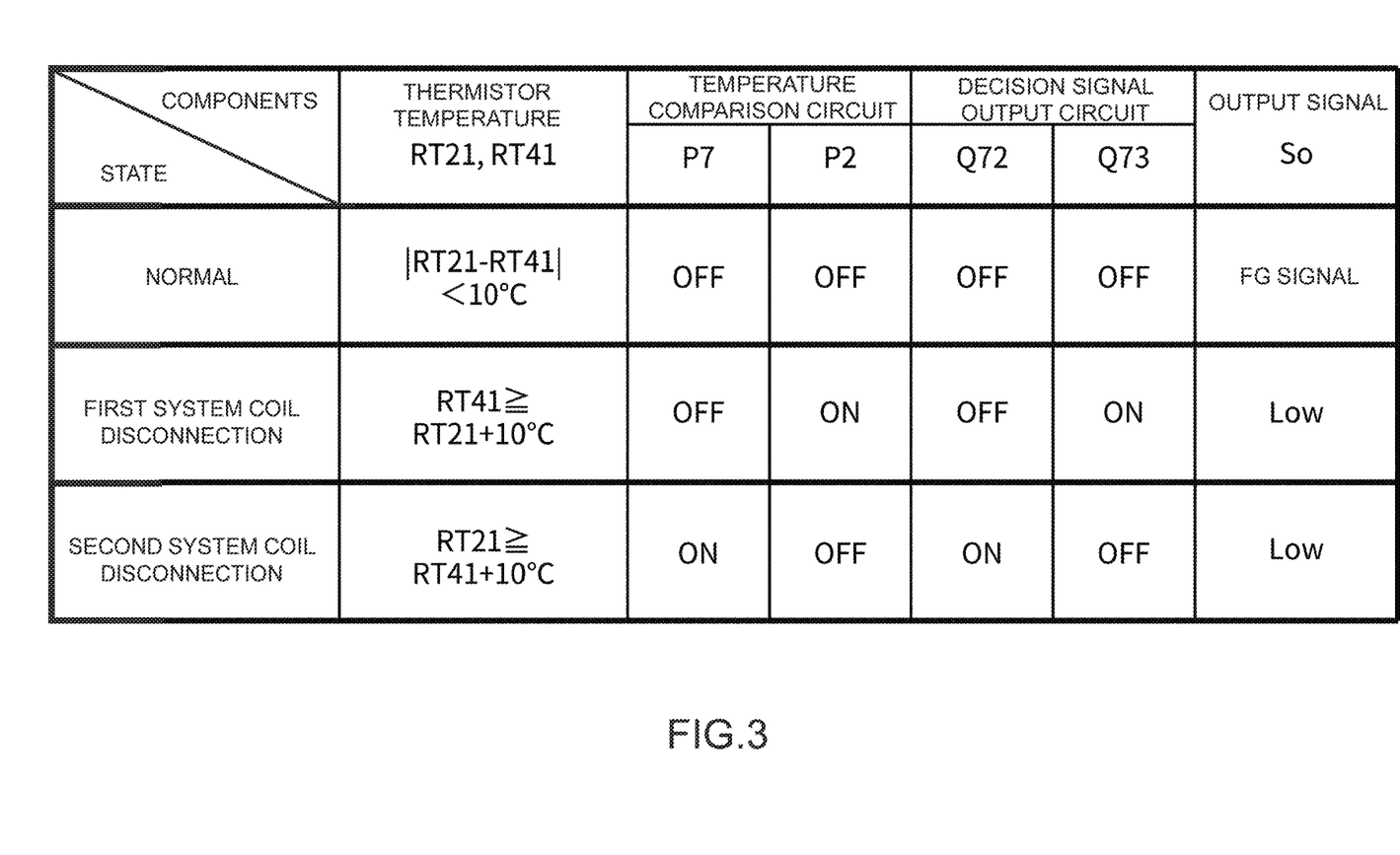
FIG. 3 is a table illustrating operations of the motor drive control device.

FIG. 3 is a table illustrating the operations of the motor drive control device 1.

In the table illustrated in FIG. 3, states of "normal", "first system coil disconnection", and "second system coil disconnection" are in rows, and the operations of the respective components in the motor drive control device 1 are in columns. In the columns, shown are a relationship between a detected temperature by the first temperature sensor RT21 (denoted by RT21 in the figure) and a detected temperature by the second temperature sensor RT41 (denoted by RT41 in the figure)(thermistor temperature RT21, RT41), a state of the output terminal P7 of the comparator CMP1 (temperature comparison circuit P7), a state of the output terminal P2 of the comparator CMP2 (temperature comparison circuit P2), a state of the transistor Q72 (decision signal output circuit Q72), a state of the transistor Q73 (decision signal output circuit Q73), and the output signal So. The "normal" is a state where the motor 50 is normally driven. The "first system coil disconnection" is a state where the first system coil 80 disconnects (open state). The "second system coil disconnection" is a state where the second system coil 80b disconnects (open state).

In FIG. 3, notations for the signal and states are as below. "|RT21-RT41|" in the column of "thermistor temperature RT21, RT41" means an absolute value of the difference between of the detected temperature by the first temperature sensor RT21 and the detected temperature by the second temperature sensor RT41. "FG signal" represents that a FG signal is output. "Low" represents that a signal of which a voltage is fixed to a low level is output. As for the output terminals P7 and P2, "OFF" represents that these terminals are connected to the ground potential, and "ON" represents that these terminals are at voltages on the basis of the power source voltage Vdc. As for the transistors Q72 and Q73, "OFF" represents that the transistor Q72 is in an off-state, that is, a state where the decision signal output circuit 25 does not connect the external output terminal 29 with the ground potential, "ON" represents that the transistor Q72 is in an on-state, that is, a state where the decision signal output circuit 25 connects the external output terminal 29 with the ground potential.

Figure 4:
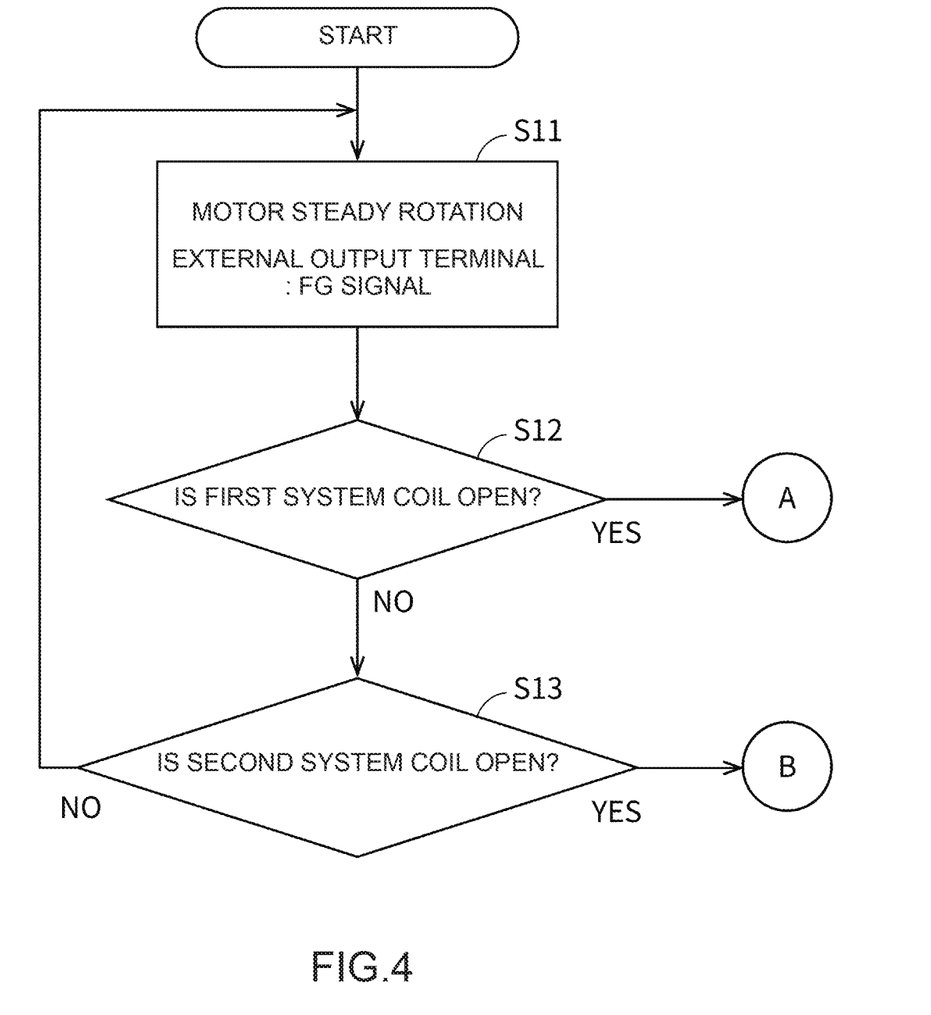
FIG. 4 is a first flowchart illustrating an operation performed by the motor drive control device.

FIG. 4 is a first flowchart illustrating the operation performed by the motor drive control device 1.

The motor drive control device 1 operates as below, caused by the signal output circuit 20 has a as described above circuit configuration.

At step S11, the motor drive control device 1 operates so that the motor 50 performs a steady rotation. This state corresponds to a state of "normal" in the table shown in FIG. 3. Specifically, the FG signal is output from the output terminal 123. At this time, a large difference is not generated between the detected temperature by the first temperature sensor RT21 and the detected temperature by the second temperature sensor RT41 (in the present embodiment, the absolute value of the difference between the detected temperatures is less than 10° C.), and the transistors Q72 and Q73 are in the off-state, and therefore, the first output signal (FG signal) is output as the output signal So from the external output terminal 29. The host device 600 can detect the rotational frequency of the motor 50, based on the output signal So.

Figure 5:
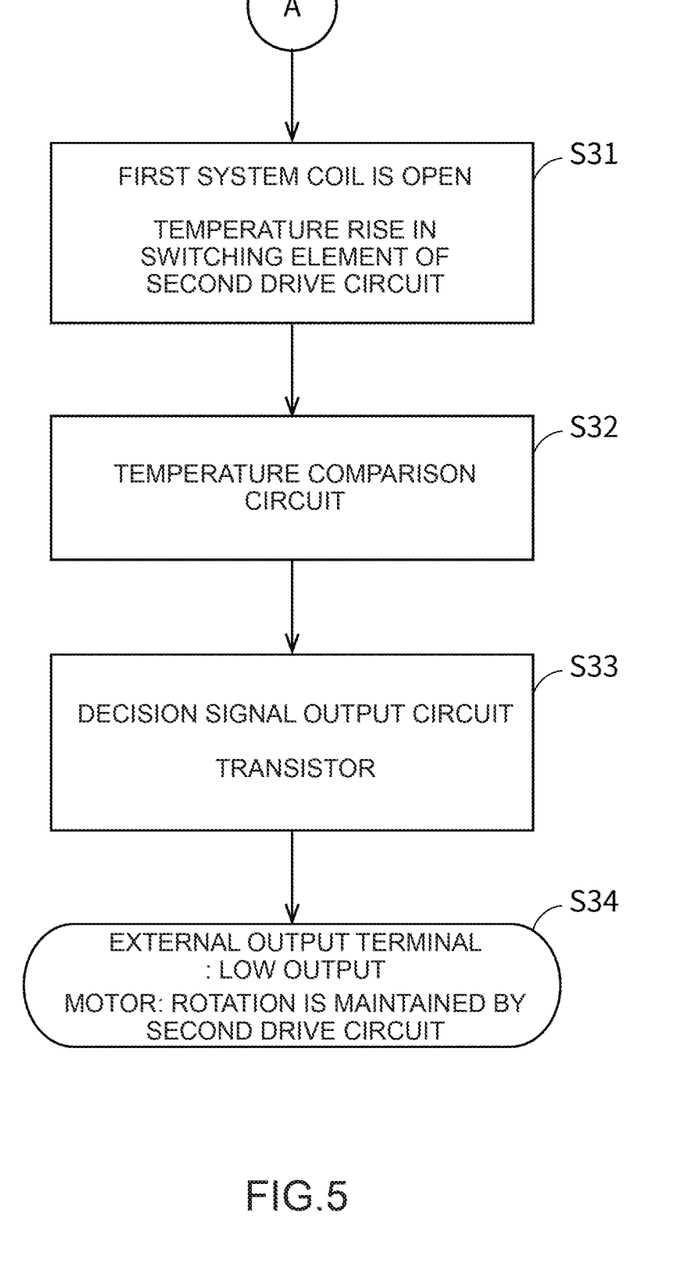
FIG. 5 is a second flowchart illustrating an operation performed by the motor drive control device.

At step S12, when the first system coil 80 of the motor 50 disconnects (YES), the process goes to step S31 (illustrated in FIG. 5). In the other case (NO), the process goes to step S13.

Figure 6:
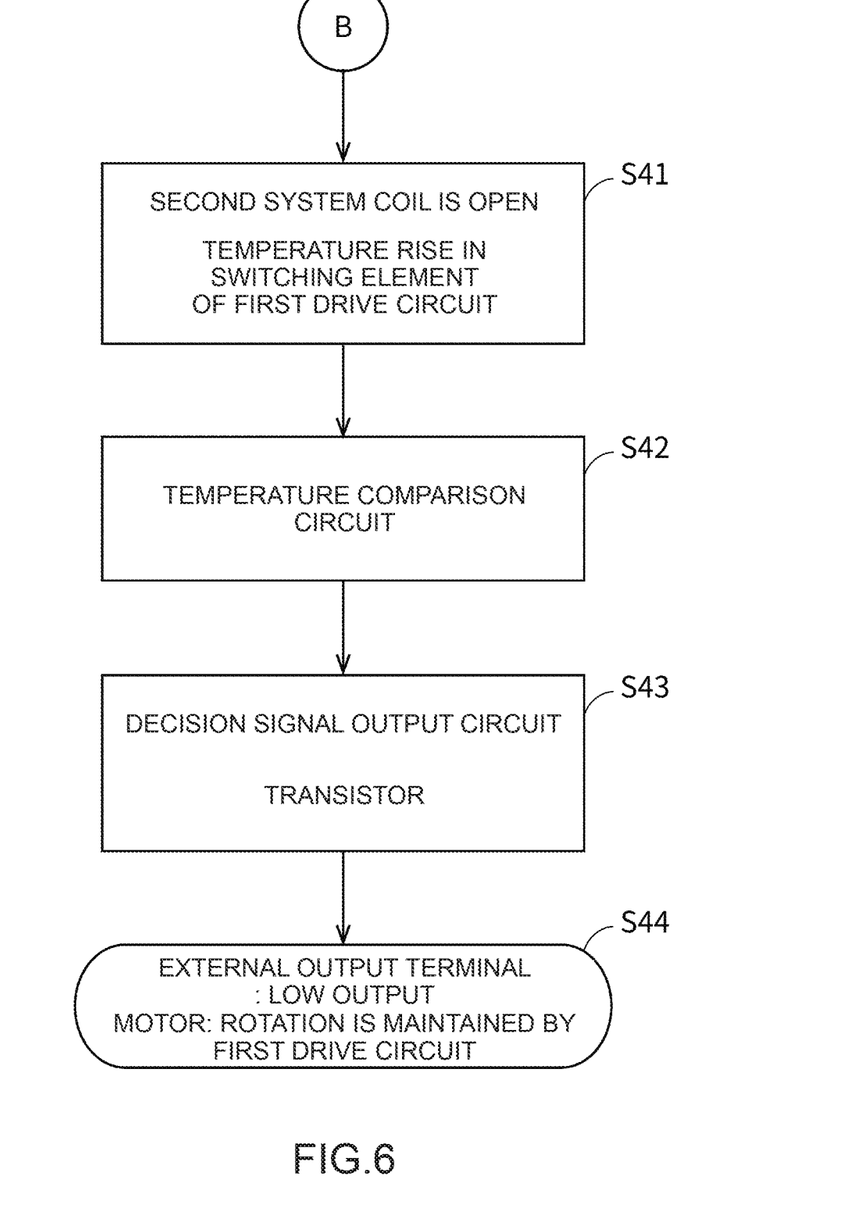
FIG. 6 is a third flowchart illustrating an operation performed by the motor drive control device.

At step S13, when the second system coil 80b of the motor 50 disconnects (YES), the process goes to step S41 (illustrated in FIG. 6). In the other case (NO), the process goes to step S11. Specifically, if the state where the motor 50 is normal continues (NO at both step S12 and step S13), the operation of step S11 continues.

FIG. 5 is a second flowchart illustrating the operation performed by the motor drive control device 1.

When the first system coil 80 of the motor 50 disconnects, the motor drive control device 1 operates as illustrated in FIG. 5. This state corresponds to a state of "first system coil disconnection" in the table shown in FIG. 3.

Specifically, if the first system coil 80 disconnects (the coil is open) while the motor 50 is driven, a temperature of a switching element included in the second drive circuit 10b particularly rises to causes the temperature of the second drive circuit 10b to rise (step S31).

Then, the temperature of the second temperature sensor RT41 rises as compared to the first temperature sensor RT21 and a resistance value of the second temperature sensor RT41 falls. When the detected temperature by the second temperature sensor RT41 is higher than the detected temperature by the first temperature sensor RT21 by 10 degrees or more, the voltage of the output terminal P2 of the comparator CMP2 turns to ON (high level) in the temperature comparison circuit 24 (step S32). At this time, the voltage of the output terminal P7 of the comparator CMP1 is OFF (low level).

When the voltage of the output terminal P2 of the comparator CMP2 turns to ON, the transistor Q73 turns to the on-state in the decision signal output circuit 25 (step S33). At this time, the transistor Q72 is in the off-state.

Then, the signal line 31 is connected to the ground potential, and the external output terminal 29 becomes the ground potential. Specifically, the second output signal (the signal of which the voltage is fixed to the ground potential) is output as the output signal So (step S34). The host device 600 detects a state where at least one of the first system coil 80 and the second system coil 80b of the motor 50 disconnects, based on the output signal So.

Note that in this case, the second drive circuit 10b continues to drive the motor 50. This allows the rotation of the motor 50 to be maintained, preventing the motor 50 from inversely rotating owing to an external force or the like.

FIG. 6 is a third flowchart illustrating the operation performed by the motor drive control device 1.

When the second system coil 80b of the motor 50 disconnects, the motor drive control device 1 operates as illustrated in FIG. 6. This state corresponds to a state of "second system coil disconnection" in the table shown in FIG. 3.

Specifically, if the second system coil 80b disconnects (the coil is open) while the motor 50 is driven, a temperature of a switching element included in the first drive circuit 10 particularly rises to causes the temperature of the first drive circuit 10 to rise (step S41).

Then, the temperature of the first temperature sensor RT21 rises as compared to the second temperature sensor RT41 and a resistance value of the first temperature sensor RT21 falls. When the detected temperature by the first temperature sensor RT21 is higher than the detected temperature by the second temperature sensor RT41 by 10 degrees or more, the voltage of the output terminal P7 of the comparator CMP1 turns to ON (high level) in the temperature comparison circuit 24 (step S42). At this time, the voltage of the output terminal P2 of the comparator CMP2 is OFF (low level).

When the voltage of the output terminal P7 of the comparator CMP1 turns to ON, the transistor Q72 turns to the on-state in the decision signal output circuit 25 (step S43). At this time, the transistor Q73 is in the off-state.

Then, the signal line 31 is connected to the ground potential, and the external output terminal 29 becomes the ground potential. Specifically, the second output signal (the signal of which the voltage is fixed to the ground potential) is output as the output signal So (step S44). The host device 600 detects a state where at least one of the first system coil 80 and the second system coil 80b of the motor 50 disconnects, based on the output signal So.

Note that in this case, the first drive circuit 10 continues to drive the motor 50. This allows the rotation of the motor 50 to be maintained, preventing the motor 50 from inversely rotating owing to an external force or the like.

As described above, in the present embodiment, the output signal So is output which concerns whether or not any one of the first system coil 80 and the second system coil 80b is in the open state, based on the detection result of the temperature of the first drive circuit 10 by the first temperature sensor RT21 and the detection result of the temperature of the second drive circuit 10b by the second temperature sensor RT41. Therefore, notification that any one of the first system coil 80 and the second system coil 80b becomes the open state in the motor 50 can be made to the outside.

The second output signal output when any one of the first system coil 80 and the second system coil 80b is in the open state is output from one external output terminal 29 from which the first output signal concerning the state of the motor 50 is output when the motor 50 is normally driven. Therefore, the number of signal lines connecting between the motor drive control device 1 and the host device 600 can be reduced, and the configuration of the motor drive control device 1 can be simplified. In the present embodiment, by use of the external output terminal 29 from which the FG signal is output as the output signal So at the normal time, notification that any one of the first system coil 80 and the second system coil 80b becomes the open state can be made to the outside by outputting the second output signal as the output signal So. Therefore, the configuration of the motor drive control device 1 can be simplified.

In the present embodiment, a circuit configuration inside the motor drive control device 1 is simple. A large scale integrated circuit or the like does not be used in order to output the output signal So concerning whether or not any one of the first system coil 80 and the second system coil 80b is in the open state, allowing a manufacturing cost of the motor drive control device 1 to be reduced. Since a simple small integrated circuit can be used to configure the motor drive control device 1, the motor drive control device 1 can be downsized.

The output signal (the second output signal) So indicating that any one of the first system coil 80 and the second system coil 80b is in the open state is output when the difference between the temperature of the first drive circuit 10 detected by the first temperature sensor RT21 and the temperature of the second drive circuit 10b detected by the second temperature sensor RT41 is larger than a predetermined value. By appropriately setting the temperature difference for determining that any one of the first system coil 80 and the second system coil 80b is in the open state, it is possible to detect appropriately that any one of the first system coil 80 and the second system coil 80b is in the open state in various external environments such as under a high temperature environment or under a low temperature environment, for example.

For example, in a case where the motor 50 is a fan motor, even if a failure occurs in the motor 50, rotation of the fan may be expected to continue. In a case where the motor 50 is used for such an application, since two systems of winding structures and circuit configurations of the motor 50 are provided in the motor drive control device 1, even if a failure occurs in one system, the remaining one system can continue to rotate motor 50. However, in the case where the remaining one system continues to rotate the motor 50 like this, if the remaining one system is failed, the rotation of the motor 50 stops, and therefore, it is preferable to rapidly notify the outside of the system failure even when only one system is failed, and take countermeasures. In the present embodiment, in a case where one of the coils 80 and 80b of the motor 50 disconnects, the disconnection is detected by detecting the temperature difference between the circuits 10 and 10b that drive the motor 50, or the like, and the second output signal indicating the disconnection is output as the output signal So. Therefore, while the remaining one system continues to rotate the motor 50, such a failure can be notified to the user. Since a circuit having an inexpensive configuration is used, without using a large scale and expensive microcomputer, the manufacturing cost of the motor drive control device 1 can be kept low.

Others

The circuit configuration of the motor drive control device is not limited to the specific example illustrated in the embodiment described above. The individual configuration in the embodiment described above may be adequately combined with the configuration a part of which is modified, or may be partially substituted to be adapted to an object of the present disclosure. In the embodiment described above, a part of the components or functions may be omitted. In addition to the above, various circuit configurations configured to be adapted to the object of the present disclosure can be applied.

For example, the decision signal output circuit may be constituted using a field-effect transistor (FET), a comparator or the like. For example, an N-channel FET or the like may be used instead of the transistor.

The first temperature sensor and the second temperature sensor are not limited to a thermistor. Various elements capable of constituting a circuit in which an output voltage varies depending on the temperature can be used.

The temperature comparison circuit may be constituted using a microcomputer or the like.

Each of the first control circuit unit and the second control circuit part may not have the inverter circuit built-in.

Figure 7:
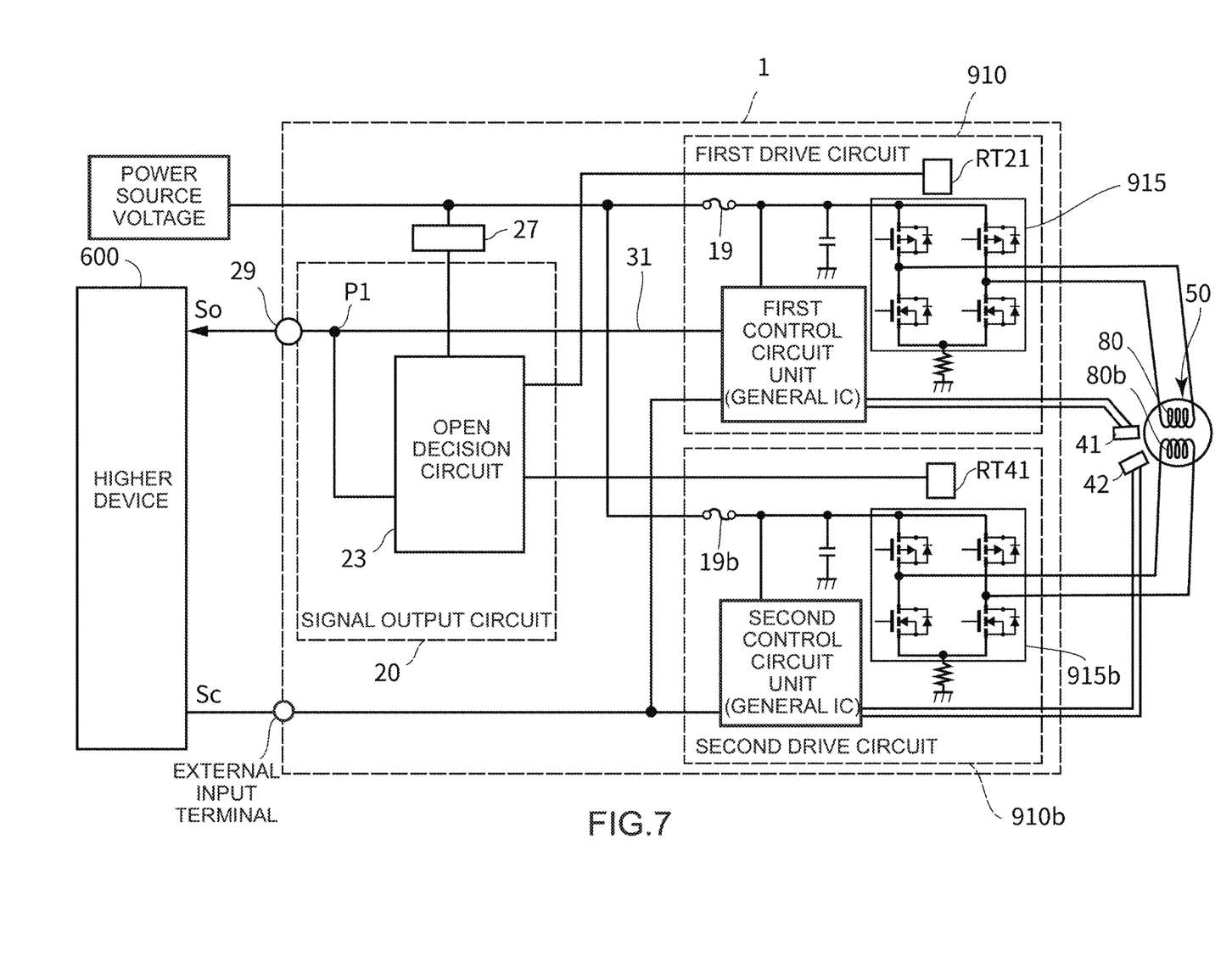
FIG. 7 is a diagram illustrating a configuration of a motor drive control device according to one variant of the present embodiment.

FIG. 7 is a diagram illustrating a configuration of a motor drive control device 1 according to one variant of the present embodiment.

In the variant illustrated in FIG. 7, the motor drive control device 1 includes a first drive circuit 910 and a second drive circuit 910b which have configurations different from those in the above described embodiment. In FIG. 7, components similar to the embodiment described above are designated by the same reference signs.

The first drive circuit 910 and the second drive circuit 910b include respectively inverter circuits 915 and 915b constituted by switching elements such as the FET. The first control circuit unit and the second control circuit part control operations of the inverter circuits 915 and 915b, respectively and do not have the inverter circuits built-in.

In the motor drive control device 1 having such a configuration, the first temperature sensor RT21 and the second temperature sensor RT41 may be respectively arranged near the inverter circuits 915 and 915b which are to be heat generation sources. By arranging the first temperature sensor RT21 and the second temperature sensor RT41 near such sites which are to be heat generation sources, a temperature change involved by disconnection of any of the coils 80 and 80b is promptly followed, and the output signal So indicating that any of the coils 80 and 80*b* disconnects can be promptly output as the second output signal.

The motor driven by the motor drive control device according to the present embodiment may not be limited the type described in the above embodiment. The motor driven by the motor drive control device may not be a single-phase motor, and the number of phases is not limited.

The control circuit part of each drive circuit is not limited to a general IC.

The number of position detectors is not limited to two. More position detectors may be used. The detection of the rotational position of the motor is not limited to a method using a Hall sensor.

The above embodiment is to be construed as exemplification in all matters and not limiting. The scope of the present disclosure is shown not in the above description but in the Claims, and is intended to include all modifications in the meaning and scope equivalent to the Claims.

What is claimed is:

1. A motor drive control device driving a motor having a first system coil and a second system coil, the motor drive control device comprising:
    a first drive circuit controlling energization of the first system coil;
    a second drive circuit controlling energization of the second system coil;
    a first temperature sensor detecting a temperature of the first drive circuit;
    a second temperature sensor detecting a temperature of the second drive circuit; and
    a signal output circuit outputting an output signal concerning whether or not any one of the first system coil and the second system coil is in an open state, based on a detection result by the first temperature sensor and a detection result by the second temperature sensor.

2. The motor drive control device according to claim 1, further comprising:
    an external output terminal from which the output signal is output, wherein the signal output circuit
    outputs, when the motor is normally driven, a first output signal as the output signal from the external output terminal, and
    outputs, when any one of the first system coil and the second system coil is in the open state, a second output signal indicating that the relevant one coil is in the open state, as the output signal, from the external output terminal.

3. The motor drive control device according to claim 2, wherein
    the first output signal is a signal of which a voltage periodically varies with a rotation of the motor, and the second output signal is a signal of which a voltage is fixed.

4. The motor drive control device according to claim 2, wherein
    the external output terminal is connected to an output terminal of the first drive circuit, and
    the first output signal is a signal output from the output terminal of the first drive circuit.

5. The motor drive control device according to claim 1, wherein
    the signal output circuit includes
        a comparison unit comparing the detection result by the first temperature sensor with the detection result by the second temperature sensor, and
        a switching circuit outputting a switching signal, based on a comparison result of the comparison unit, and
    outputs the output signal in accordance with the switching signal.

6. The motor drive control device according to claim 1, wherein
    when a difference between the temperature of the first drive circuit detected by the first temperature sensor and the temperature of the second drive circuit detected by the second temperature sensor is larger than a predetermined value, the signal output circuit outputs an output signal indicating that any one of the first system coil and the second system coil is in the open state.

* * * * *